United States Patent [19]

Kyster

[11] 4,297,845
[45] Nov. 3, 1981

[54] METERING TYPE HYDROSTATIC STEERING UNIT WITH PLANETARY GEARING TYPE INPUT AND FEEDBACK MEANS

[75] Inventor: Erik Kyster, Augustenborg, Denmark

[73] Assignee: Danfoss A/S, Nordborg, Denmark

[21] Appl. No.: 97,349

[22] Filed: Nov. 26, 1979

[30] Foreign Application Priority Data

Dec. 13, 1978 [DE] Fed. Rep. of Germany ....... 2853704

[51] Int. Cl.³ .......................... B62D 5/08; F15B 13/04
[52] U.S. Cl. ........................................ 60/384; 91/381; 137/625.24; 180/132
[58] Field of Search ............................ 60/384; 91/381; 180/132, 146; 74/388 PS; 137/625.24

[56] References Cited

U.S. PATENT DOCUMENTS

| 2,886,008 | 5/1959 | Geyer et al. | 91/381 X |
| 3,103,986 | 9/1963 | Barton et al. | 91/381 X |
| 3,400,537 | 9/1968 | Mercier . | |
| 3,509,958 | 5/1970 | Lang | 60/384 |
| 4,109,679 | 8/1978 | Johnson | 180/132 X |

Primary Examiner—Irwin C. Cohen

Attorney, Agent, or Firm—Wayne B. Easton

[57] ABSTRACT

The invention relates to a hydrostatic control unit of the metering type utilized for some automotive type power steering systems. The control unit has a valving section with inlet and outlet ports connectable to a pump and a tank and two working ports connectable to opposite sides of a bidirectional servomotor which is connectable to wheel steering linkage. A metering motor controlled by the valving section supplies and exhausts metered fluid to and from the servomotor through the two working ports of the valving section. The valving section has a single movable slide element cooperable with a stationary housing member. A gearing unit which may be of the planetary type is provided having two inputs and one output with the two inputs being connectable to the vehicle steering wheel and the metering motor input shaft and the output being connectable to the slide valve element. The steering wheel and metering motor inputs always act in opposite directions on the valve element such that a movement of the valve element away from a neutral position by the steering wheel is always followed by movement of the valve element back towards the neutral position by the shaft of the metering motor.

1 Claim, 4 Drawing Figures

METERING TYPE HYDROSTATIC STEERING UNIT WITH PLANETARY GEARING TYPE INPUT AND FEEDBACK MEANS

The invention relates to hydrostatic steering means comprising a control valve which supplies a steering motor with pressure fluid fed by a pump depending on the direction and, in a fixed housing, has a valve slide which is adjustable by a steering member and can be reset by means of a gear connected rotor of a measuring motor traversed by the pressure fluid flowing to the steering motor.

In known steering means of this kind (e.g. U.S. Pat. No. 3,400,537), the control valve operates as a 6/3-way valve. The valve slide is in the form of an axial slide which can assume a neutral position and two operative positions. In the operative positions, an amount of pressure fluid depending on the position of the valve slide is fed by the pump to the one side of the steering motor by way of the measuring motor while the other side is connected to the tank by way of the control valve, or vice versa. The valve slide is carried along axially by a sleeve which is connected to a steering wheel against rotation but for axial displacement. The sleeve is fixed to a helical gear. The latter is in mesh with a smaller helical gear on the shaft of the measuring motor. If the steering wheel is turned while the measuring motor is stationary, the axial slide is displaced because of the helical teeth on the gears. When the measuring motor then turns, axial resetting is effected.

The axial displacement obtainable for a given angle of rotation of the steering wheel is comparatively small. This presents difficulties if the steering means are on the one hand to respond to small turns of the steering wheel but on the other hand be well sealed and give low leakage losses in the neutral position.

These problems are considerably less aggravating when using rotary slides. For a given angle of rotation of the steering wheel, the absolute value of the peripheral path of the rotary slide essential for sealing in the neutral position can be increased merely by increasing the effective diameter.

Hydrostatic steering means are known which have a rotary slide control valve comprising two relatively rotatable sleeves. The one sleeve is adjusted by the steering member and the other sleeve is made to follow by the measuring motor. The measuring motor comprises an orbiting and revolving rotor connected to the one sleeve by a cardan shaft. This measuring motor can be traversed by a large amount of pressure fluid at comparatively low rotary speeds.

The invention is based on the problem of providing hydrostatic steering means of the aforementiond kind in which the sole movable valve element is a rotary slide.

This problem is solved by epicyclic gearing of which the three central rotary components, namely the sunwheel, annular gear and planet carrier, are each connected to the steering member, to the valve slide in the form of a rotary slide and to the rotor of the measuring motor.

In this construction, the epicyclic gearing ensures that the rotary slide will undergo a rotary displacement depending on the rotation of the steering member and a rotary return movement depending on the rotation of the motor shaft. In addition, the epicyclic gearing may serve as step-down gearing which adapts a higher angular speed of the measuring motor to a lower angular speed of the steering member. One can therefore use a comparatively small and fast measuring motor having a fixed motor shaft. The control valve is nevertheless of simple construction because only a rotary slide needs to be adjusted in a fixed housing.

It is particularly favourable if the rotary slide is a sleeve through which the motor shaft passes centrally. This permits the control valve and measuring motor to be disposed coaxially. One can even arrange all of the steering member, epicyclic gearing, control valve and measuring motor coaxially so that a compact construction is obtained.

Further, the steering member may engage the annular gear, the rotor may engage the sunwheel and the rotary slide may engage the planet carrier. This results in a comparatively high step-down ratio for the motor. In addition, it is possible for the rotary slide itself to form the planet carrier.

A still higher step-down ratio is obtained if the steering member engages the planet carrier, the rotor engages the sunwheel and the rotary slide engages the annular gear.

Since the epicyclic gearing already prescribes a certain diameter for the apparatus, it is advisable to make the external diameter of the rotary slide substantially equal to or larger than the internal diameter of the annular gear. This provides large distances at the periphery of the rotary slide for very small angles of rotation of the rotary slide so that the requirement for fine actuation and good sealing in the neutral position can be particularly well achieved.

The invention will now be described in more detail with reference to examples shown in the drawing, wherein.

Figure 1:
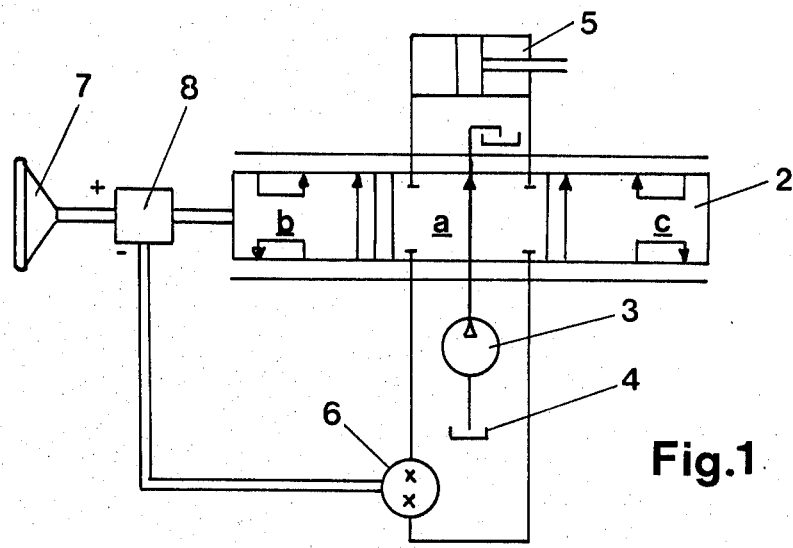
FIG. 1 is a diagrammatic block diagram of hydrostatic steering means according to the classifying portion.

The control valve 1 shown in FIG. 1 has three positions, namely a neutral position a and operative positions b and c resulting from displacements of the valve slide 2. In the neutral position, a pump 3 feeds pressure fluid from a tank 4 back to the tank. The operative conduits to a steering motor 5 which, for example, adjusts the wheels of a vehicle, are blocked. In the two operative positions, the pump 3 feeds pressure fluid by way of a measuring motor 6 to one side of the steering motor 5 and back to the tank from the other side. A steering member 7, e.g. a steering wheel, acts on servo-gearing 8 with which the valve slide 2 can be moved. As soon as pressure fluid flows through the measuring motor 6, the latter likewise acts on the servo-gearing 8, but in the opposite sense so that the valve slide 2 is returned.

Figure 2:
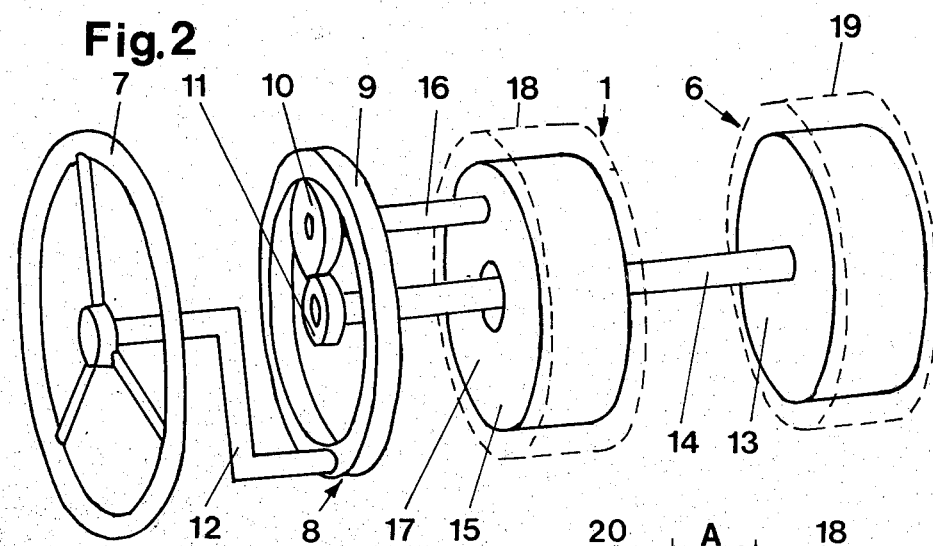
FIG. 2 is a simplified pictorial view of the steering member, epicyclic gearing, control valve and measuring motor.
Figures 3, 4:
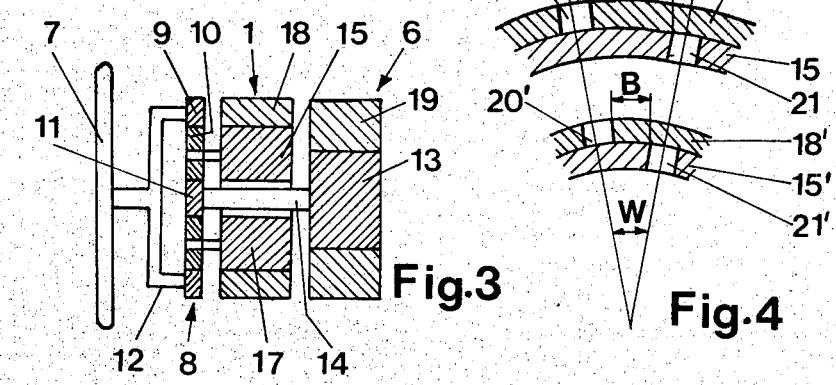
FIG. 3 is a longitudinal section through a slightly modified version of FIG. 2.
FIG. 4 is a comparative representation of rotary slides with different diameters.

In the embodiment of FIG. 2 according to the invention, the sevo-gearing is constituted by epicyclic gearing 8 comprising an annular gear 9, at least one planet wheel 10 and one sunwheel 11. The annular gear 9 is connected to the steering member by crank rods 12. The sunwheel 11 is fixed on a motor shaft 14 which is fixed with respect to the housing and driven by the rotor 13 of the measuring motor 6. The valve slide 2 is in the form of a rotary slide 15. It also carries the shafts 16 for at least one planet wheel 10 and therefore also constitutes a planet carrier 17. The control valve 1 as well as the measuring motor 6 each have a housing 18 and 19, respectively, which is shown in broken lines in FIG. 2 and in diagrammatic section in FIG. 3. The housing and rotary slide of the control valve may have grooves or bores along their common peripheral surface to provide the desired 6/3-way valve function. The measuring motor can for example be a conventional gear motor.

The peripheral surface of the rotary slide 15 has a diameter corresponding to the internal diameter of the annular gear 9. This has the following advantage in comparison with a control valve in which the housing 18′ and the rotary slide 15′ have a smaller diameter. Assuming that for fine control the control apertures 20 in the housing and 21 in the rotary slide or 20′ and 21′, respectively, may be at a maximum angle $\omega$ from each other in the neutral position so that fine steering is still possible, then the distance A between the control apertures and responsible for the seal is substantially greater in the case of the rotary slide of larger diameter than is the distance B for the rotary slide of smaller diameter. One can in this way very considerably reduce the leakage losses or, conversely, one can improve the steering properties by reducing the angle $\omega$.

In operation, by turning the steering member 7 the annular gear 9 is turned through the same angle. Since the sunwheel 11 is held by the rotor of the stationary measuring motor, the planet wheel 10 rolls along its orbiting path and takes the rotary slide 15 with it. The measuring motor is traversed by pressure fluid and the sunwheel 11 turns in a direction opposite to that of the annular gear 9. This causes the planet wheel 10 to be turned back again, whereby the control valve closes. If the steering member 7 is turned continuously, the sunwheel executes a return motion which ensures that the open position of the control valve has a position corresponding to the rotary speed of the steering member. This manner of operation applies to both directions of rotation.

The epicyclic gearing 8 also steps down the rotary speed of the measuring motor 6. If one assumes that the diameter of the planet wheel 10 is twice that of the sunwheel 11, the resulting step-down ratio is 1:5.

If the steering member 7 is associated with the rotary slide 15 and the rotor 13 is associated with other central rotary components of the epicyclic gearing 8, different step-down ratios will be obtained. For example, with the same diameter ratios one obtains a step-down ratio of 1:6 if the steering member 7 engages the planet carrier, the rotor 13 engages the sunwheel 11 and the rotary slide 15 engages the annular gear 9.

What is claimed is:

1. A hydrostatic steering assembly, comprising, a bidirectional servomotor, a control valve unit having inlet and outlet ports and two working ports connected to said servomotor, pump and tank means connected to said inlet and outlet ports, said control valve unit having a fixed housing member and an annularly shaped valve member rotatable relative thereto in opposite directions with respect to a neutral position, epicyclic gearing having a ring gear and a sun gear with planetary gear means therebetween, steering shaft means connected to said ring gear, bidirectional metering motor means having output shaft means connected to said sun gear and being operated by fluid pressure from said control valve unit for supplying metered quantities of pressurized fluid to selected sides of said servomotor through said working ports, said metering motor output shaft means extending through said valve member, and said planetary gear means being connected to said valve member for moving said valve member in opposite selected directions away from and towards said neutral position responsive to actuation by said steering shaft means.

* * * * *